US009602799B2

(12) United States Patent
Kobayashi et al.

(10) Patent No.: US 9,602,799 B2
(45) Date of Patent: Mar. 21, 2017

(54) DEVICE, METHOD, AND COMPUTER PROGRAM FOR THREE-DIMENSIONAL VIDEO PROCESSING

(75) Inventors: Yuki Kobayashi, Osaka (JP); Yuki Maruyama, Osaka (JP); Kentaro Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 805 days.

(21) Appl. No.: 13/365,858

(22) Filed: Feb. 3, 2012

(65) Prior Publication Data
US 2012/0182401 A1 Jul. 19, 2012

Related U.S. Application Data

(63) Continuation of application No. PCT/JP2011/003634, filed on Jun. 24, 2011.

(30) Foreign Application Priority Data

Jan. 14, 2011 (JP) ................................ 2011-005815

(51) Int. Cl.
*H04N 13/04* (2006.01)
*H04N 13/00* (2006.01)
(Continued)

(52) U.S. Cl.
CPC ........... *H04N 13/0018* (2013.01); *G06T 1/20* (2013.01); *H04N 13/0239* (2013.01); *H04N 13/0438* (2013.01); *H04N 2013/0081* (2013.01)

(58) Field of Classification Search
None
See application file for complete search history.

(56) References Cited

U.S. PATENT DOCUMENTS 6,108,005 A 8/2000 Starks et al.
2003/0083551 A1 5/2003 Takahashi
(Continued)

FOREIGN PATENT DOCUMENTS

JP 11-127456 5/1999
JP 2000-228778 A 8/2000
(Continued)

OTHER PUBLICATIONS

International Search Report issued in International Patent Application No. PCT/JP2011/003634, filed Jun. 24, 2011.

*Primary Examiner* — Frederick Bailey
(74) *Attorney, Agent, or Firm* — McDermott Will & Emery LLP

(57) ABSTRACT

A 3D video processing device includes a disparity map generator which compares a first-perspective image from a first perspective with a second-perspective image from a second perspective, which are two images forming stereoscopic video, thereby generates a disparity map which represents disparity of the second-perspective image with respect to the first-perspective image, a first new image generator which rotates the first-perspective image based on rotation angle information which represents rotation statuses of the first- and the second-perspective images, thereby generates a new first-perspective image, and a second new image generator which generates a new second-perspective image, which is paired with the new first-perspective image to form stereoscopic video, based on the first-perspective image and on the disparity map.

20 Claims, 8 Drawing Sheets

(51) Int. Cl.
*H04N 13/02* (2006.01)
*G06T 1/20* (2006.01)

(56) References Cited

U.S. PATENT DOCUMENTS

| | | | | |
|---|---|---|---|---|
| 2007/0248260 | A1* | 10/2007 | Pockett | H04N 13/0022 382/154 |
| 2009/0073170 | A1* | 3/2009 | Berretty | G06K 9/20 345/427 |
| 2010/0182406 | A1* | 7/2010 | Benitez | 348/46 |
| 2010/0277571 | A1* | 11/2010 | Xu et al. | 348/47 |
| 2011/0074933 | A1* | 3/2011 | Held et al. | 348/51 |
| 2011/0080466 | A1* | 4/2011 | Kask | G06T 7/0022 348/43 |
| 2011/0292045 | A1 | 12/2011 | Nakamura et al. | |
| 2012/0007850 | A1* | 1/2012 | Piemonte | G06F 3/04815 345/419 |

FOREIGN PATENT DOCUMENTS

| | | |
|---|---|---|
| JP | 2001-128195 A | 5/2001 |
| JP | 2002-281526 A | 9/2002 |
| JP | 2010-226390 | 10/2010 |
| WO | WO 2012/095899 A | 7/2012 |

\* cited by examiner

FIG.8
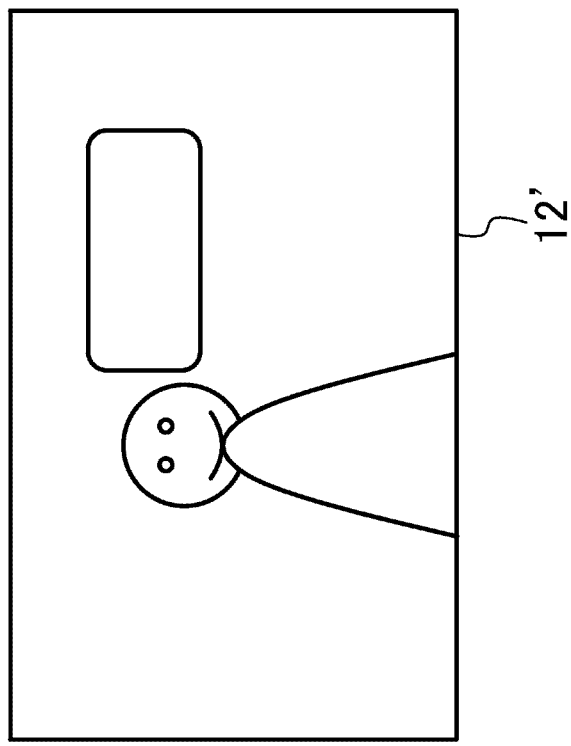
12'
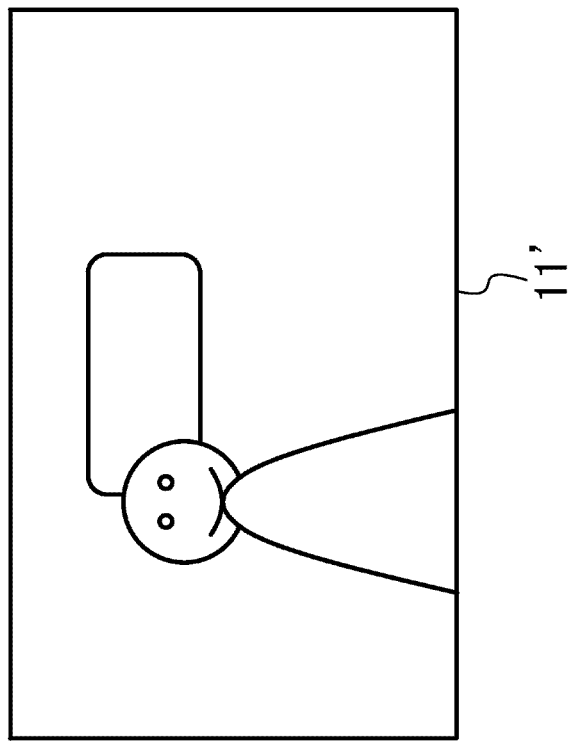
11'

DEVICE, METHOD, AND COMPUTER PROGRAM FOR THREE-DIMENSIONAL VIDEO PROCESSING

CROSS-REFERENCE TO RELATED APPLICATION

This is a continuation of PCT International Application PCT/JP2011/003634 filed on Jun. 24, 2011, which claims priority to Japanese Patent Application No. 2001-005815 filed on Jan. 14, 2011. The disclosures of these applications including the specifications, the drawings, and the claims are hereby incorporated by reference in its entirety.

BACKGROUND

The present disclosure relates to devices, methods, and computer programs for three-dimensional (3D) video processing, which are suitable for 3D video imaging devices, 3D video display devices, etc.

A technique (hereinafter referred to as 3D viewing) has been known which reproduces a 3D video signal by imaging left- and right-eye video with binocular parallax, and then displaying the imaged left- and right-eye video on a display device capable of individually projecting the imaged left- and right-eye video onto left and right eyes. A general method for obtaining left- and right-eye video is to synchronously capture images using two horizontally aligned cameras, or to capture subject images from different perspectives generated based on two optical systems.

When a 3D video signal is captured using the technique described above, the video signal obtained by capturing an image is processed as an optimum video signal when a viewer views the video signal as a two-dimensional (2D) video signal. As such, when the video signal is to be viewed as a 3D video signal, signal processing suitable for 3D viewing (hereinafter referred to as 3D video processing) needs to be performed on that video signal.

A conventional method for 3D video processing is suggested in Japanese Patent Publication No. H11-127456 (Patent Document 1) in which a higher level of edge enhancement is performed on a closer subject depending on the amount of binocular parallax.

Conventional 3D video processing as described in Patent Document 1 requires two cameras or two optical systems to be aligned on a line perpendicular to a generally vertical direction of the subject.

However, general imaging operations may possibly be performed such that the two cameras or the two optical systems are not aligned on a line perpendicular to a generally vertical direction of the subject. One example is to capture an image in a portrait orientation. If two paired images captured in such a situation are rotated and displayed, the displayed images cannot be viewed with intended 3D appearance.

SUMMARY

The present invention is advantageous in processing two paired images which are captured as 3D video so that two paired images are displayed with more natural 3D appearance.

According to one aspect of the present invention, a 3D video processing device includes a disparity map generator configured to compare a first-perspective image from a first perspective with a second-perspective image from a second perspective, which are two images forming stereoscopic video, thereby to generate a disparity map which represents disparity of the second-perspective image with respect to the first-perspective image, a first new image generator configured to rotate the first-perspective image based on rotation angle information which represents rotation statuses of the first- and the second-perspective images, thereby to generate a new first-perspective image, and a second new image generator configured to generate a new second-perspective image, which is paired with the new first-perspective image to form stereoscopic video, based on the first-perspective image and on the disparity map.

According to this, a disparity map which represents disparity of the second-perspective image with respect to the first-perspective image is generated, a new first-perspective image is generated by rotating the first-perspective image, and a new second-perspective image, which is paired with the new first-perspective image to form stereoscopic video, is generated based on the first-perspective image and on the disparity map. The new first- and the new second-perspective images generated in such a manner together form stereoscopic video having more natural 3D appearance.

More specifically, the second new image generator rotates the first-perspective image and the disparity map based on the rotation angle information, and displaces the rotated first-perspective image based on the rotated disparity map, thereby generates the new second-perspective image. The second new image generator may use the new first-perspective image generated by the first new image generator, as the rotated first-perspective image.

Alternatively, more specifically, the second new image generator generates an image by displacing the first-perspective image based on the disparity map along an axial direction determined by the rotation angle information, and rotates the generated image based on the rotation angle information, thereby generates the new second-perspective image.

Preferably, the second new image generator generates the new second-perspective image so that a relative location relationship between subjects in stereoscopic video formed by the new first- and the new second-perspective images matches a relative location relationship determined from the rotated disparity map rotated based on the rotation angle information.

Also, preferably, if a rotation angle of the first- and the second-perspective images is nearly zero, the 3D video processing device stops both the first and the second new image generators from generating new images.

BRIEF DESCRIPTION OF THE DRAWINGS

FIG. 8 is a diagram illustrating an example of a new first- and a new second-perspective images.

DETAILED DESCRIPTION

An example embodiment will be described, in which a 3D video processing device according to the present invention is applied to a digital camera, with reference to the drawings.

<1-1. Configuration of Digital Camera>

Figure 1:
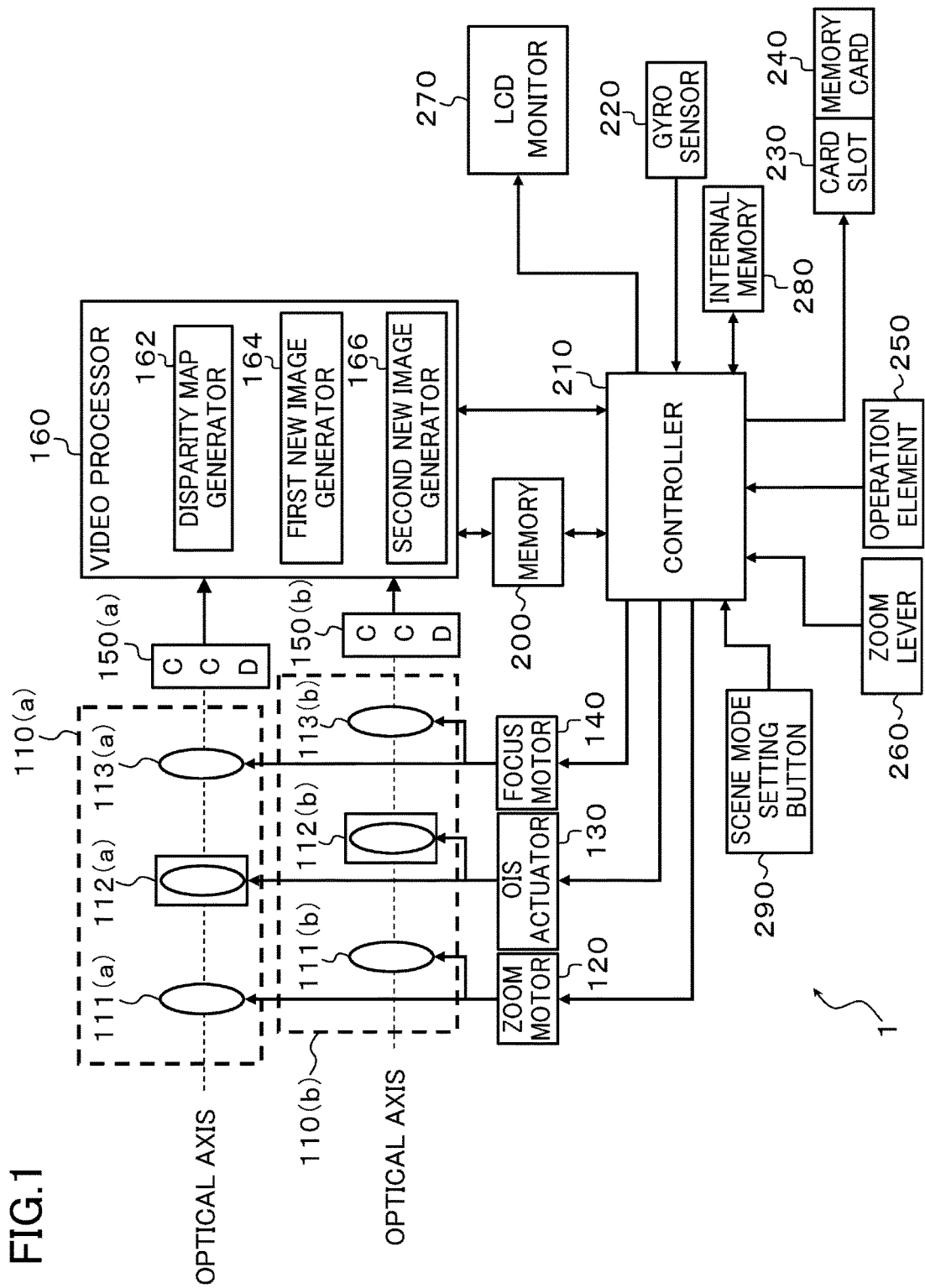
FIG. 1 is a schematic diagram illustrating a 3D video processing device according to one embodiment of the present invention.

A configuration of a digital camera according to this embodiment will be described using FIG. 1. A digital camera 1 includes optical systems 110(a) and 110(b), a zoom motor 120, an optical image stabilizer (OIS) actuator 130, a focus motor 140, charge coupled device (CCD) image sensors 150(a) and 150(b), a video processor 160, a memory 200, a controller 210, a gyro sensor 220, a card slot 230, a memory card 240, an operation element 250, a zoom lever 260, a liquid crystal display (LCD) monitor 270, an internal memory 280, and a scene mode setting button 290.

The optical system 110(a) includes a zoom lens 111(a), an OIS 112(a), and a focus lens 113(a). The optical system 110(b) includes a zoom lens 111(b), an OIS 112(b), and a focus lens 113(b). The optical system 110(a) forms a subject image from a first perspective. The optical system 110(b) forms a subject image from a second perspective, which differs from the first perspective.

The zoom lenses 111(a) and 111(b) respectively move along the optical axes of the optical systems, thereby allowing the subject image to be zoomed in or out. The zoom lenses 111(a) and 111(b) are controlled by the zoom motor 120.

The OISs 112(a) and 112(b) each include therein a correcting lens which is movable in a plane perpendicular to the optical axis. The OISs 112(a) and 112(b) each drive the corresponding correcting lens in a direction which compensates the shake of the digital camera 1, thereby reducing the vibration of the subject image. The correcting lenses can each move from the center to a maximum distance of L from the center in the OISs 112(a) and 112(b). The OISs 112(a) and 112(b) are controlled by the OIS actuator 130.

The focus lenses 113(a) and 113(b) respectively move along the optical axes of the optical systems, thereby adjust the focus of the subject image. The focus lenses 113(a) and 113(b) are controlled by the focus motor 140.

The zoom motor 120 drives and controls the zoom lenses 111(a) and 111(b). The zoom motor 120 may be implemented by a pulse motor, a DC motor, a linear motor, a servomotor, etc. The zoom motor 120 may drive the zoom lenses 111(a) and 111(b) through a cam mechanism or a mechanism such as a ball screw. The zoom motor 120 may drive the zoom lenses 111(a) and 111(b) by a same operation.

The OIS actuator 130 drives and controls the correcting lenses in the OISs 112(a) and 112(b) in planes perpendicular to the respective optical axes. The OIS actuator 130 can be implemented by a planar coil, an ultrasonic motor, etc.

The focus motor 140 drives and controls the focus lenses 113(a) and 113(b). The focus motor 140 may be implemented by a pulse motor, a DC motor, a linear motor, a servomotor, etc. The focus motor 140 may drive the focus lenses 113(a) and 113(b) through a cam mechanism or a mechanism such as a ball screw.

The CCD image sensors 150(a) and 150(b) respectively capture the subject images formed in the optical systems 110(a) and 110(b), and respectively generate a first- and a second-perspective images. The CCD image sensors 150(a) and 150(b) perform various operations such as exposure, transfer, and electronic shutter operations. The first- and the second-perspective images together form stereoscopic video when viewed in combination.

The video processor 160 performs various processing operations on the first- and the second-perspective images generated by the CCD image sensors 150(a) and 150(b). The video processor 160 processes the first- and the second-perspective images, thereby generates image data (hereinafter referred to as review image) to be displayed in the LCD monitor 270. The video processor 160 also generates a video signal which will be restored in the memory card 240. For example, the video processor 160 performs various video processing operations, such as gamma correction, white balance correction, and artifact correction, on the first- and the second-perspective images.

The video processor 160 performs, for example, enhancement processes, such as an edge enhancement process, on the first- and the second-perspective images based on a control signal from the controller 210.

In addition, the video processor 160 compresses the video signals of the processed first- and second-perspective images using a compression format compliant to the JPEG standard etc. The compressed video signals obtained by compressing the first- and the second-perspective images are linked to each other, and recorded in the memory card 240. It is preferable that the two video signals be recorded using a format called Multi-Picture Format (MPF). If the video signals to be compressed are moving pictures, a video compression standard such as H.264/AVC is used. MPF data, and JPEG image data or MPEG video data may be simultaneously recorded.

Further, the video processor 160 generates a new first-perspective image and a new second-perspective image which together form stereoscopic video having more natural 3D appearance, from the first- and the second-perspective images generated by the CCD image sensors 150(a) and 150(b), or from the first- and the second-perspective images stored in the memory card 240. Specifically, in order to generate the new first- and the new second-perspective images, the video processor 160 includes a disparity map generator 162, a first new image generator 164, and a second new image generator 166.

The disparity map generator 162 compares the first and the second-perspective images, and generates a disparity map which represents the disparity of the second-perspective image with respect to the first-perspective image. The disparity represented in the disparity map allows depth information to be uniquely identified, which is a relative location relationship between subjects displayed in the first- and the second-perspective images in the depth direction of the images. A process for generating the disparity map will be described later.

The first new image generator 164 rotates the first-perspective image based on rotation angle information (described later), thereby generates the new first-perspective image. The first-perspective image may be either a right- or a left-eye image.

The second new image generator 166 generates a new second-perspective image, which is paired with the new first-perspective image to form stereoscopic video, based on the first-perspective image and on the disparity map. There are two methods for generating the new second-perspective image. One method is to rotate both the first-perspective image and the disparity map based on the rotation angle information, and to displace the rotated first-perspective image based on the rotated disparity map, thereby to generate the new second-perspective image. In this case, the image obtained by rotating the first-perspective image is exactly the new first-perspective image generated by the first new image generator 164, and accordingly the second new image generator 166 may use the new first-perspective image generated by the first new image generator 164, as the rotated first-perspective image. The other method is to generate an image by displacing the first-perspective image based on the disparity map along an axial direction determined by the rotation angle information, and to rotate the generated image based on the rotation angle information, thereby to generate the new second-perspective image. Examples of generating the new second-perspective image using these two methods will be described later.

The video processor 160 can be implemented by a digital signal processor (DSP), a microcomputer, etc. The resolution of the review image may be set to the display resolution of the LCD monitor 270, or may be set to the resolution of image data formed by compression using a compression format compliant to the JPEG standard etc.

The memory 200 serves as a working memory for both the video processor 160 and the controller 210. The memory 200 temporarily stores, for example, a video signal which has been processed in the video processor 160, or image data before being processed in the video processor 160, input from the CCD image sensors 150(*a*) and 150(*b*). The memory 200 also temporarily stores imaging conditions of the optical systems 110(*a*) and 110(*b*) and the CCD image sensors 150(*a*) and 150(*b*) at the time of image capturing. Imaging conditions include distance to the subject, angle-of-view information, ISO sensitivity, shutter speed, EV value, F number, lens-to-lens distance, time of capturing, shift amount of the OIS, etc. The memory 200 can be implemented by, for example, a DRAM, a ferroelectric memory, etc.

The controller 210 is a control unit for controlling the whole system. The controller 210 can be implemented by a semiconductor device etc. The controller 210 can be formed only by hardware, or may be implemented in a combination of software and hardware. The controller 210 can be implemented by a microcomputer, etc.

The gyro sensor 220 is formed by a vibration element etc. such as a piezoelectric element. The gyro sensor 220 obtains angular velocity information by oscillating a vibration element such as a piezoelectric element at a constant frequency, and converting the force due to Coriolis force into a voltage. Receiving the angular velocity information from the gyro sensor 220, and then driving the correcting lenses in the OISs 112(*a*) and 112(*b*) in a direction so as to compensate the vibration compensates the shake of the digital camera 1 caused by the user. The gyro sensor 220 only needs to be capable of measuring at least angular velocity information of the angle of pitch. If the gyro sensor 220 can measure angular velocity information of the angle of roll, consideration can be given to rotation of the digital camera 1 when the digital camera 1 moves along a generally horizontal direction.

The card slot 230 allows the memory card 240 to be attached and detached. The card slot 230 can be connected to the memory card 240 physically and electrically.

The memory card 240 includes therein a flash memory, a ferroelectric memory, etc., and thus can store data. In a word, any device can be used as the memory card 240 as long as the device can store data. Thus, the memory card 240 may be an SD card, a compact flash (registered trademark), an SSD, a hard disk drive, or an optical disk.

The operation element 250 includes a release button. The release button receives a push operation by a user. When the release button is pressed halfway down, automatic focus (AF) control and automatic exposure (AE) control are started through the controller 210. When the release button is pushed down completely, an image of the subject is captured.

The operation element 250 also receives from the user the rotation angle information which represents rotation statuses of the first- and the second-perspective images. The rotation angle information is used to determine how much to rotate the first- and the second-perspective images upon displaying these images. For example, the operation element 250 receives rotation angle information representing a rotation of 90 degrees from the user, and outputs the rotation angle information to the controller 210. The controller 210 outputs a control signal to the video processor 160 based on the rotation angle information received. When receiving the control signal corresponding to a rotation of 90 degrees from the controller 210, the video processor 160 rotates the first-perspective image by 90 degrees.

The zoom lever 260 receives from the user an instruction to change the zoom factor.

The LCD monitor 270 is a display device which can display in a 2D or a 3D display format the first- and the second-perspective images generated by the CCD image sensors 150(*a*) and 150(*b*), or the first- and the second-perspective images read from the memory card 240. The LCD monitor 270 can display various setting information in relation to the digital camera 1. For example, the LCD monitor 270 can display imaging conditions at the time of image capturing, such as EV value, F number, shutter speed, and ISO sensitivity.

If a 2D display format is used, the LCD monitor 270 may select either the first- or the second-perspective image and display the selected image, may split the screen horizontally or vertically and display both the first- and the second-perspective images, or may display both the first- and the second-perspective images alternately on each line.

If a 3D display format is used, the LCD monitor 270 may display the first- and the second-perspective images using a frame sequential format, or may display the first- and the second-perspective images as overlaid on each other. Alternatively, the LCD monitor 270 may be configured so as to include a lenticular lens or a parallax barrier so that the first- and the second-perspective images can be viewed as stereoscopic video with the naked eye.

The internal memory 280 is formed by a flash memory, a ferroelectric memory, etc. The internal memory 280 stores a control program etc. for controlling the whole digital camera 1.

The scene mode setting button 290 sets the scene mode for capturing an image by the digital camera 1. The scene mode specifies a scene type intended by the user. Examples of the scene mode include, for example, 2D scene modes including (1) portrait, (2) children, (3) pet, (4) macro, and (5) scenery modes, and (6) the 3D scene mode. The 2D scene modes (1)-(5) may each have a corresponding 3D scene mode. The digital camera 1 captures an image after setting appropriate parameters based on the scene mode. An automatic camera setting mode in which the digital camera 1 performs automatic setting may also be provided. The scene mode setting button 290 also sets the playback mode of the video signal recorded in the memory card 240.

<1-2. Detailed Operation of Video Processor 160>

A process flow for generating the disparity map and a process flow for generating the new second-perspective image in the video processor 160 will be described below with reference to the drawings.

<1-2-1. Flow for Generating Disparity Map>

First, the process flow for generating the disparity map will be described.

Figure 2:
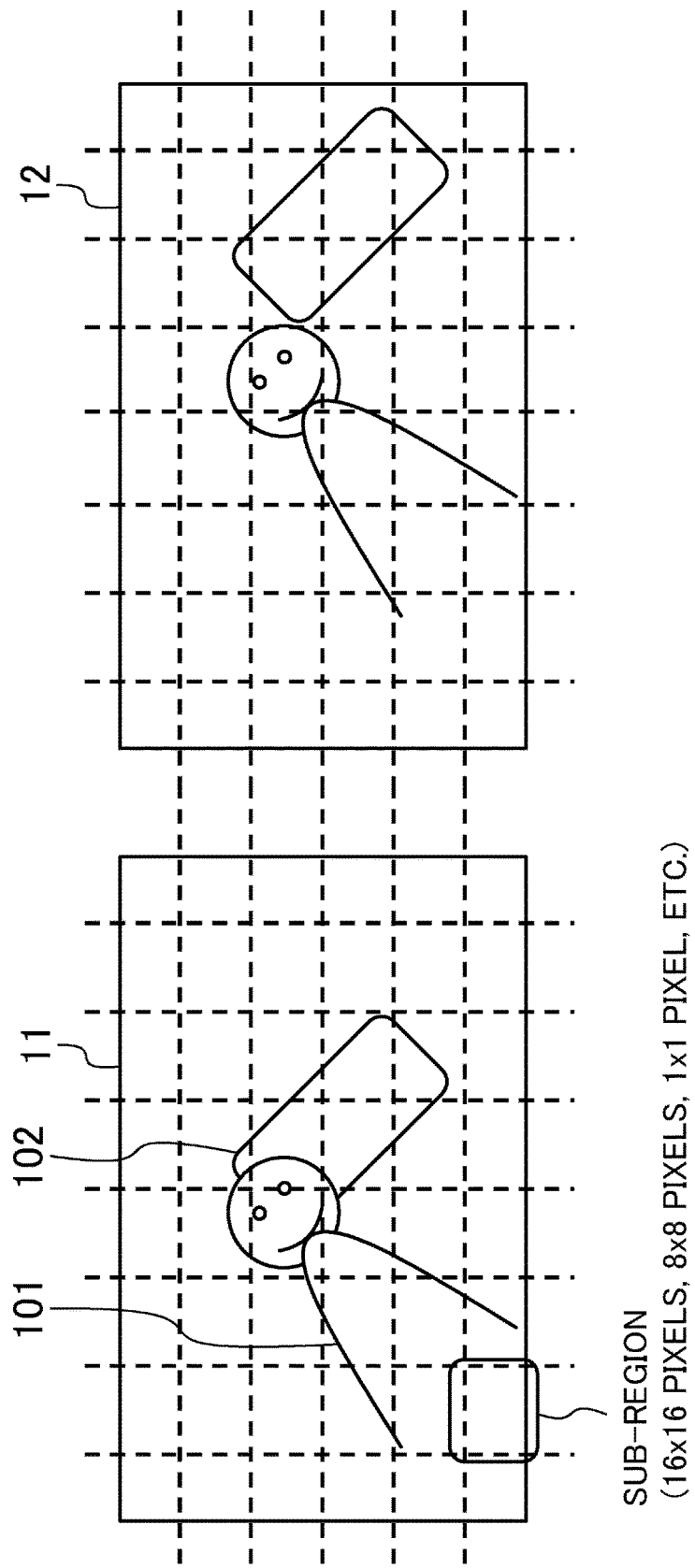
FIG. 2 is a diagram illustrating an example of the first- and the second-perspective images.

FIG. 2 illustrates an example of the first- and the second-perspective images. Subjects 101 and 102 are both displayed in the first- and the second-perspective images 11 and 12.

As shown in FIG. 2, for example, the disparity map generator 162 determines the amount of parallax (disparity) in each of sub-regions which are obtained by dividing the entire region of the first-perspective image 11 read from the memory 200. The number of sub-regions may be set based on the amount of processing of the whole digital camera 1. For example, when the processing load of the digital camera 1 is concerned, control is provided so that if the amount of processing is well below a limit, then the number of sub-regions is increased, while if the amount of processing is near the limit, then the number of sub-regions is decreased. More specifically, if the amount of processing of the digital camera 1 is well below a limit, then the disparity map generator 162 may determine the amount of parallax pixel by pixel, while if the amount of processing is near the limit, then the disparity map generator 162 may arrange the sub-regions each having a size of 16×16 pixels, and determine a representative amount of parallax for each of the sub-regions.

The amount of parallax is, for example, the amount of horizontal disparity of the second-perspective image 12 with respect to the first-perspective image 11. In this case, the disparity map generator 162 performs a block matching process between sub-regions of the first- and of the second-perspective images 11 and 12. The disparity map generator 162 calculates the amounts of horizontal disparity, and sets the amounts of parallax, based on the results of the block matching process.

Figure 3:
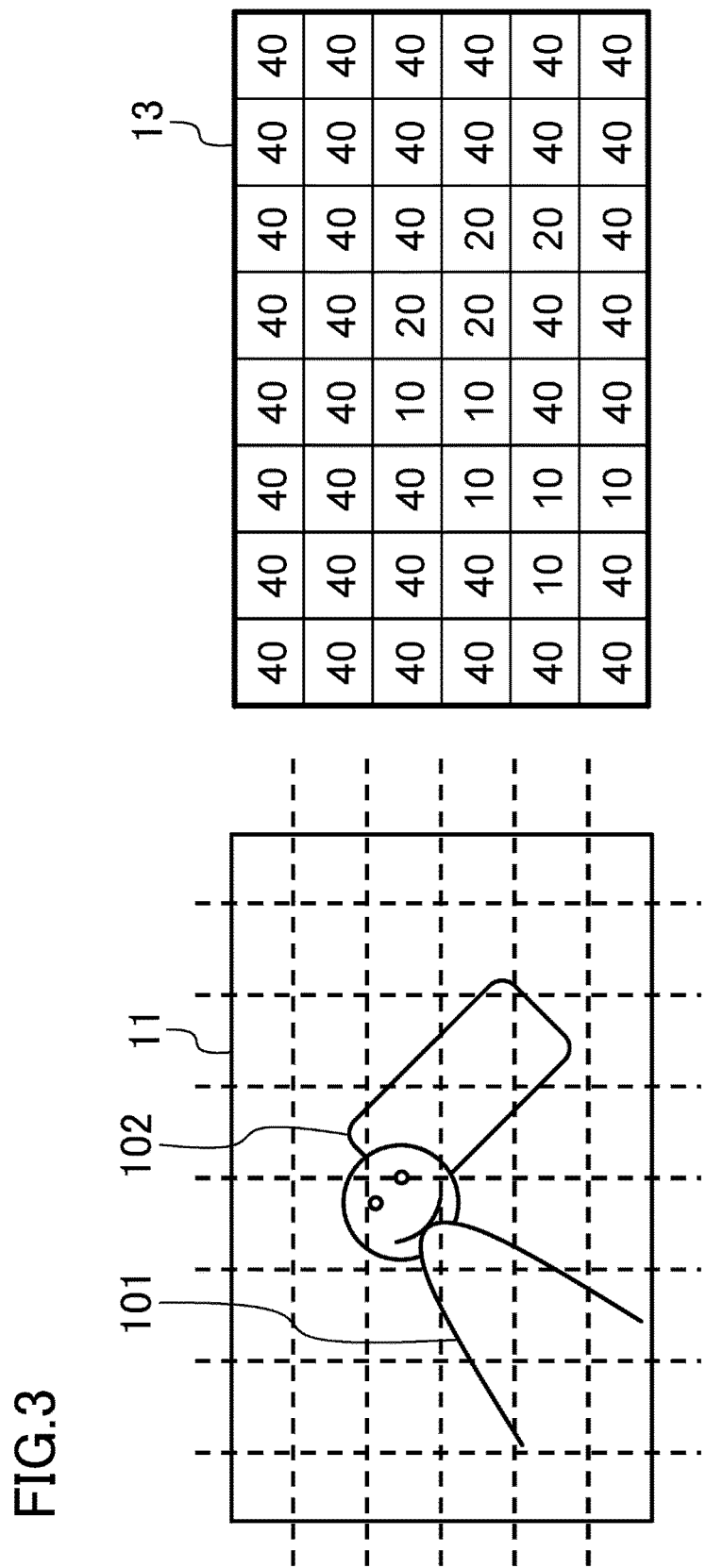
FIG. 3 is a diagram illustrating an example of the first-perspective image and the disparity map corresponding thereto.

FIG. 3 illustrates an example of the first-perspective image 11 and the disparity map 13 corresponding thereto. The disparity map 13 shows in number of pixels the amounts of horizontal disparity between the first- and the second-perspective images 11 and 12. That is, the amounts of disparity of the subjects 101 and 102 and of the background are 10 pixels, 20 pixels, and 40 pixels, respectively. This provides the relative location relationship between the subjects in the depth direction of the images. That is, a region having a larger amount of disparity is located at a deeper location than a region having a smaller amount of disparity.

Different shooting methods, that is, shooting using the parallel view method and shooting using the cross-eyed view method cause a same subject to have different amounts of disparity between the first- and the second-perspective images. In addition, shooting stereoscopic video using the cross-eyed view method may generate a negative value for the amount of disparity.

Although the above description assumes that the amounts of horizontal disparity are simply expressed as pixel values of an image, other values may be used. For example, the amount of horizontal disparity may be expressed by the number of pixels of an image by which the image is horizontally displaced with respect to the horizontal size of the image. That is, if an image has a horizontal size of 1920 pixels, and the image is horizontally displaced by 40 pixels, then the amount of horizontal disparity becomes 2%.

If the video processor 160 rotates the first-perspective image, it is preferable that a disparity map corresponding to the first-perspective image be generated. Here, a disparity map corresponding to the first-perspective image means a set of information representing the amounts of parallax of the subjects displayed in the first-perspective image. Meanwhile, there is also a disparity map corresponding to the second-perspective image. The reason why such two kinds of disparity map exist is that occlusions occur in the first- and the second-perspective images. Such occlusions occur when the shooting locations for the first- and the second-perspective images differ. An occlusion also occurs from a change in how a subject looks (e.g., trapezoidal distortion) due to misalignment of the optical axis.

<1-2-2. Flow for Generating New Second-Perspective Image>

Next, a generation method of the new second-perspective image in the video processor 160 will be described. For purposes of illustration, the generation method provided below assumes that the disparity map is generated based on the first-perspective image, and then an image (new second-perspective image) which is paired with the new first-perspective image is generated.

Figure 4:
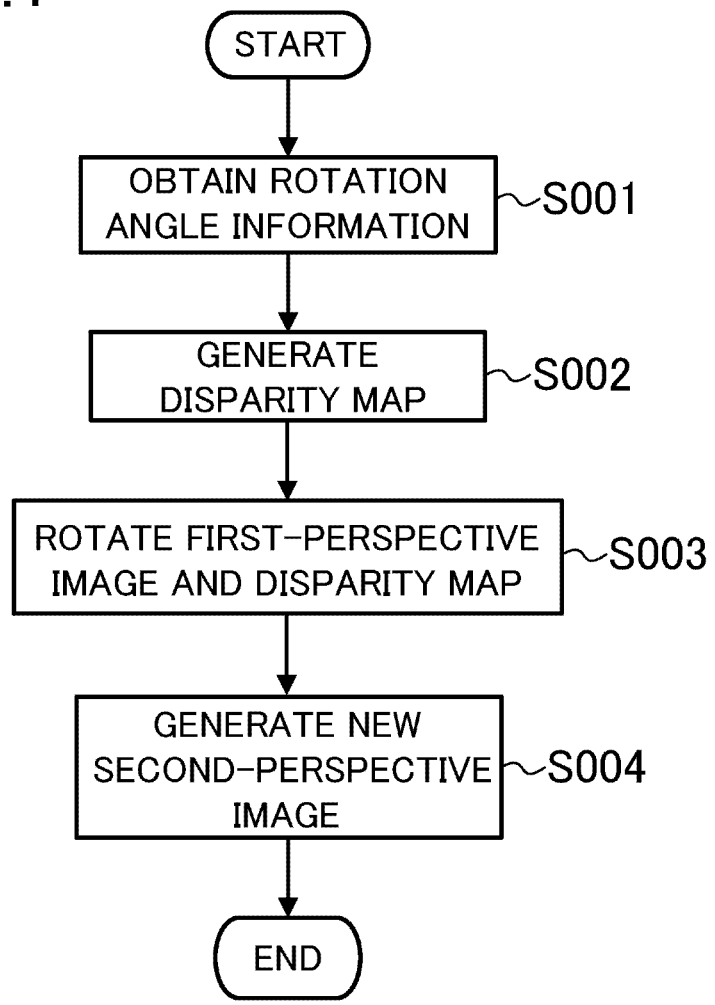
FIG. 4 is a flowchart of generating a new second-perspective image.

FIG. 4 is a flowchart of generating a new second-perspective image in the video processor 160.

(S001) First, the video processor 160 obtains rotation angle information on the image rotation output by the controller 210. If the video processor 160 does not obtain rotation angle information, the process terminates without any further processing.

(S002) Next, the video processor 160 generates a disparity map using the method described in section <1-2-1>.

Figure 5:
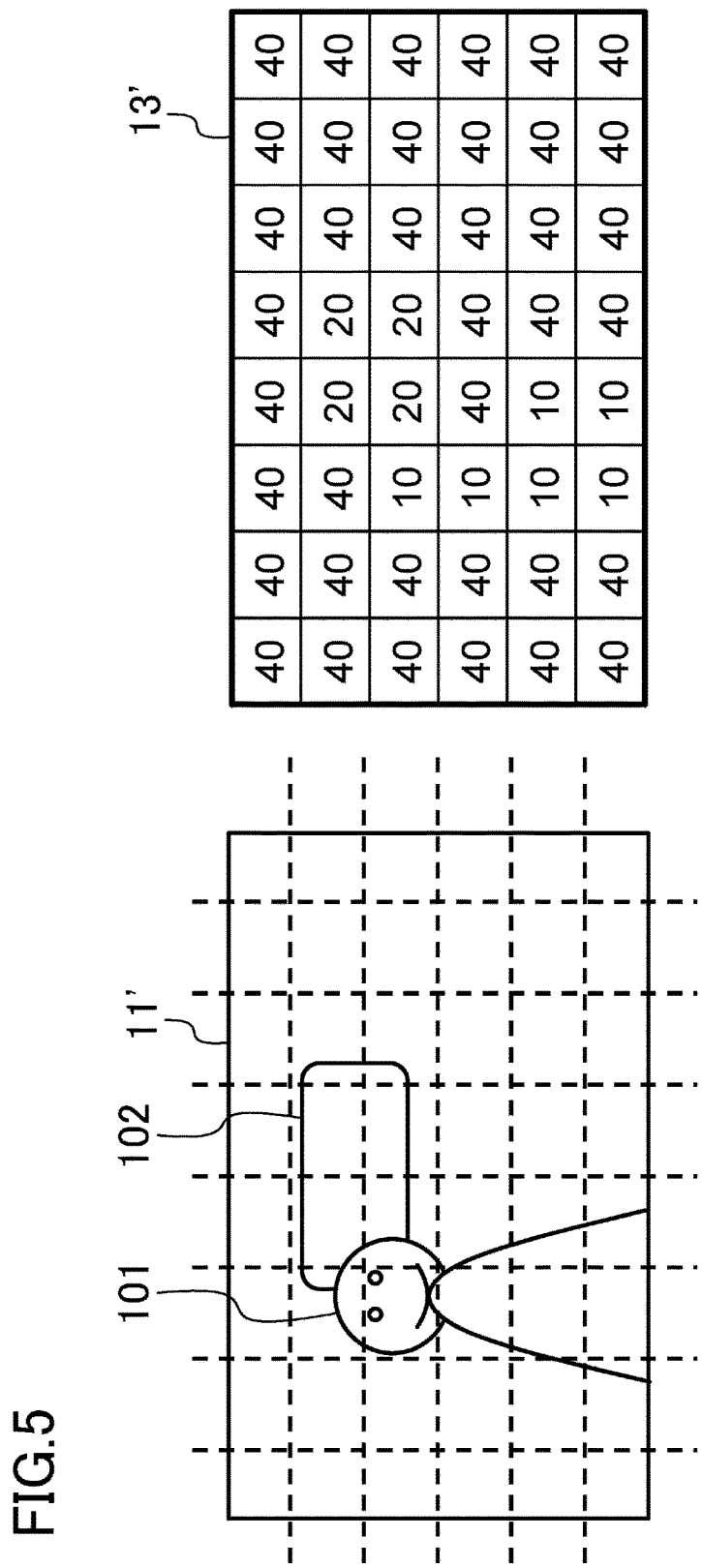
FIG. 5 is a diagram illustrating an example of the rotated first-perspective image and the disparity map corresponding thereto.

(S003) Next, the video processor 160 rotates the first-perspective image and the disparity map based on the rotation angle information on the image rotation output by the controller 210. For example, assume that the controller 210 outputs rotation angle information representing a rotation of −45 degrees, and the first-perspective image 11 and the disparity map 13 of FIG. 3 are obtained and generated by the method described in section <1-2-1>. In this case, the video processor 160 generates a first-perspective image (new first-perspective image) 11' and a disparity map 13' as shown in FIG. 5. That is, the video processor 160 rotates the first-perspective image 11 and the disparity map 13 shown in FIG. 3 by −45 degrees.

(S004) Then, the video processor 160 generates an image (new second-perspective image) which is paired with the rotated first-perspective image based on the rotated first-perspective image (new first-perspective image) 11' and on the rotated disparity map 13'. In this case, the video processor 160 generates the new second-perspective image so that the relative location relationship between the subjects shown by the rotated disparity map will be maintained when a viewer views the new first- and second-perspective images as stereoscopic video. Note that the generation method of the new second-perspective image may be any conventional method as long as that method generates a paired image from an image and a disparity map. More specifically, a 2D-to-3D conversion technique can be used to achieve this.

The operation of step S001 may be performed at any time before the operation of step S003.

The rotation angle information may be generated by a user who operates the operation element 250 as described above, or may be generated by the gyro sensor 220, which determines the rotation status of the digital camera 1.

(Another Flow of Generation)

The video processor 160 may generate the new second-perspective image using a generation flow described below.

Figure 6:
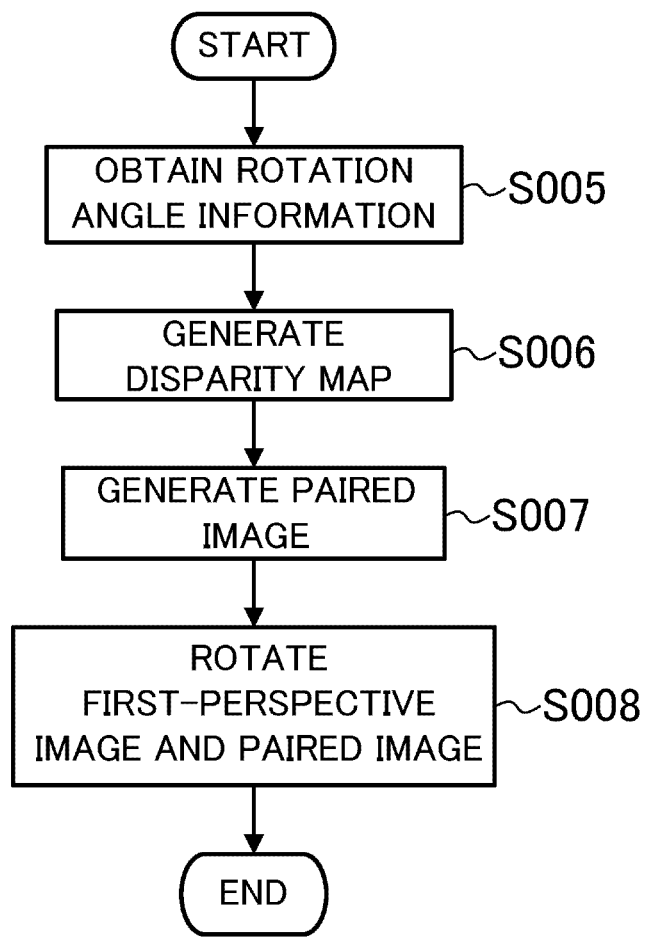
FIG. 6 is another flowchart of generating a new second-perspective image.

FIG. 6 is another flowchart of generating a new second-perspective image.

(S005) First, the video processor 160 obtains rotation angle information on the image rotation output by the controller 210. If the video processor 160 does not obtain rotation angle information, the process terminates without any further processing.

(S006) Next, the video processor 160 calculates a disparity map using the method described in section <1-2-1>.

(S007) Next, the video processor 160 generates an image which is paired with the first-perspective image based on the first-perspective image and on the disparity map.

Figure 7:
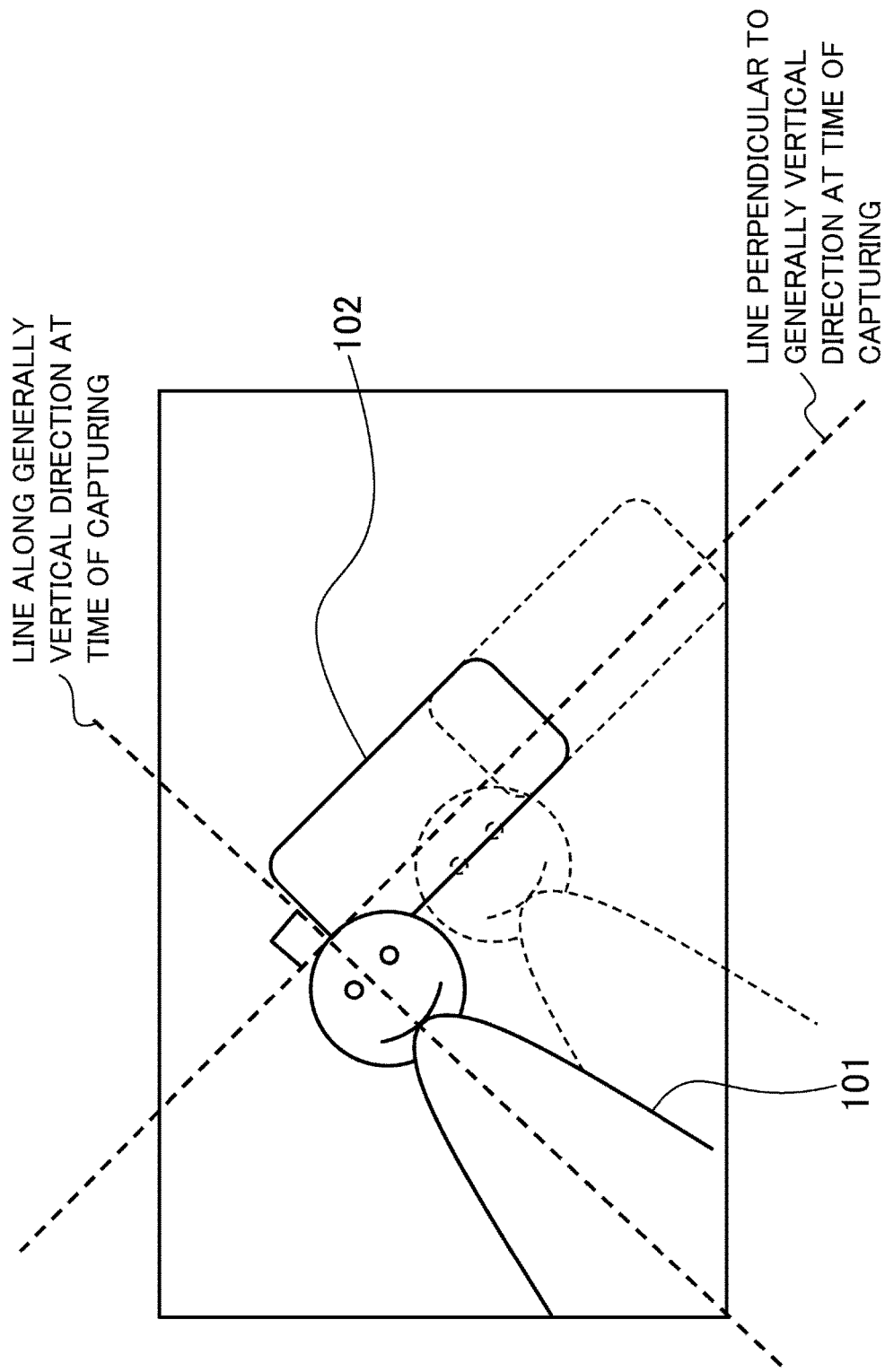
FIG. 7 is a diagram illustrating an example of an image which is paired with the first-perspective image.

FIG. 7 is a diagram for describing the paired image generated by the video processor 160.

The video processor 160 generates a paired image as shown in FIG. 7. The video processor 160 generates an image by providing an amount of parallax based on the disparity map along a direction of the line shown in FIG. 7, which is perpendicular to a generally vertical direction at the time of image capturing. Note that the direction of the perpendicular line can be determined based on the rotation angle information. In this case, the video processor 160 generates the paired image so that the relative location relationship between the subjects shown by the rotated disparity map will be maintained when a viewer views the rotated first-perspective image and the paired image as stereoscopic video. Note that the generation method of the paired image may be any conventional method as long as that method generates a paired image from an image and a disparity map. More specifically, a 2D-to-3D conversion technique can be used to achieve this.

(S008) Next, the video processor 160 rotates the first-perspective image and the paired image which has been generated at step S007 based on the rotation angle information on the image rotation output by the controller 210. For example, assume that the controller 210 outputs a control signal representing a rotation of −45 degrees. In this case, the video processor 160 generates a new first- and a new second-perspective images 11' and 12' as shown in FIG. 8.

The operation of step S005 may be performed at any time before the operation of step S008.

The video processor 160 outputs the new first- and the new second-perspective images through the controller 210 to the LCD monitor 270. The video processor 160 may output the new first- and the new second-perspective images through the controller 210 and the card slot 230 to the memory card 240.

If the rotation angle for the first- and the second-perspective images is nearly zero, then the video processor 160 may stop both the first and the second new image generators 164 and 166 from generating the new images. This allows generation operations of the new images to be performed only when a 3D appearance is lost when the first- and the second-perspective images are viewed as stereoscopic video after rotating those images, thereby allowing the power consumption to be reduced.

2. OTHER EMBODIMENTS

In the digital camera 1 described in the above embodiment, each of the blocks may be individually implemented on a single chip of a semiconductor device such as a large scale integrated circuit (LSI), or a part or all of the blocks may be integrated on a single chip.

Although a term LSI is used here, the semiconductor device may also be referred to as IC, system LSI, super LSI, or ultra LSI depending on the integration level.

The technique for implementing an integrated circuit is not limited to an LSI, but circuit integration may be achieved by a dedicated circuit or a general purpose processor. A field programmable gate array (FPGA), which is programmable after the LSI fabrication, or a reconfigurable processor in which connections and settings of circuit cells in the LSI can be reconfigured, may be used.

Moreover, if a technology of implementing an integrated circuit which supersedes the LSI is achieved due to a progress of semiconductor technology or another technology derived therefrom, function blocks may, of course, be integrated using such a technology. Application of biotechnology etc. may also be one possibility.

Each of the processes of the embodiment described above may be implemented in hardware, or in software as a computer program. The computer program may be recorded and distributed, for example, in a computer-readable recording medium. Moreover, each of the processes of the embodiment may be implemented in a combination of hardware and software. Needless to say, implementation of the digital camera 1 according to the embodiment described above in hardware requires timing adjustment for performing the processes. In the embodiment described above, explanations of timing adjustment of various signals required in actual hardware designing are omitted for purposes of illustration.

The order of operating the processing methods in the embodiment described above is not necessarily limited to those described in the embodiment, but changes may be made thereto without departing from the spirit and scope of the present invention.

The specific configuration according to the present invention is not limited to those described in the embodiments described above, but various modifications and changes may be made thereto without departing from the spirit and scope of the present invention.

The device and the method for 3D video processing according to the present invention allow a video signal to be generated which provides more natural 3D appearance when viewed, and thus the present invention can be applied to digital cameras which shoot 3D video, to recorders and players which record and reproduce 3D video, and to display devices such as televisions, photo frames, and personal digital assistants (PDAs).

What is claimed is:
1. A video processing device comprising:
    an input device for obtaining a first input image of a first perspective and a second input image of a second perspective different from the first perspective, the first input image and the second input image having a rectangular shape; and
    an output device for outputting a first output image of the first perspective and a second output image of the second perspective, the first output image and the second output image having the rectangular shape,
    wherein the video processing device is configured to:
        generate a first disparity map, which has the rectangular shape, from the first input image and the second input image; and
        when the first output image is generated by rotating an orientation of the first input image by an angle in the rectangular shape, generate a second disparity map, which has the rectangular shape, by rotating an orientation of the first disparity map by the angle within the rectangular shape, and generate pixels of the second output image by shifting pixels of the first output image in a longer side direction in which a longer side of the rectangular shape extends, based on the second disparity map.
2. The video processing device according to claim 1, further comprising a vertical sensor configured to detect the angle which is between a short side direction of the rectangular shape and an orientation of a vertical direction in the video processing device.

3. The video processing device according to claim 1, wherein:
the input device comprises a first image sensor and a second image sensor,
the first image of the first perspective is captured by the first image sensor, and
the second image of the second perspective is captured by the second image sensor.

4. The video processing device according to claim 1, wherein the output device comprises a display.

5. The video processing device according to claim 1, wherein the output device comprises a memory card slot.

6. The video processing device according to claim 1, wherein the first image of the first perspective is for a right eye of a user, and the second image of the first perspective is for a left eye of the user.

7. The video processing device according to claim 1, wherein the first image of the first perspective is for a left eye of a user, and the second image of the first perspective is for a right eye of the user.

8. The video processing device according to claim 1, wherein:
each of the first input image, the second input image, and the first disparity map comprises sub-regions, and
a disparity amount of each sub-region of the first disparity map is calculated with a block matching process between the sub-regions of the first input image and the corresponding sub-regions of the second input image.

9. The video processing device according to claim 8, wherein each sub-region of the sub-regions of the first input image, the second input image, and the first disparity map comprises 16×16 pixels.

10. The video processing device according to claim 8, wherein the pixels of the second output image is generated by shifting the pixels of the first output image in the longer side direction of the rectangular shape, based on a disparity amount of each sub-region of the second disparity map.

11. A video processing method for a video processing device,
the video processing device comprising:
an input device for obtaining a first input image of a first perspective and a second input image of a second perspective being different from the first perspective, the first input image and the second input image having a rectangular shape; and
an output device for outputting a first output image of the first perspective and a second output image of the second perspective,
the video processing method comprising:
generating a first disparity map, which has the rectangular shape, from the first input image and the second input image; and
when the first output image, which has the rectangular shape, is rotated at an angle from the first input image, generating a second disparity map by rotating, by the angle, the first disparity map within the rectangular shape, and generating pixels of the second output image by shifting pixels of the first output image in a longer side direction in which a longer side of the rectangular shape extends, based on the second disparity map.

12. The video processing method according to claim 11, wherein:
the video processing device further comprises a vertical sensor configured to detect the angle which is between a short side direction of the rectangular shape and an orientation of a vertical direction in the video processing device, and
the method further comprises detecting the angle by the vertical sensor.

13. The video processing method according to claim 11, wherein:
the input device comprises a first image sensor and a second image sensor, and
the method further comprises:
capturing the first image of the first perspective by the first image sensor; and
capturing the second image of the second perspective by the second image sensor.

14. The video processing method according to claim 11, wherein the output device comprises a display.

15. The video processing method according to claim 11, wherein the output device comprises a memory card slot.

16. The video processing method according to claim 11, wherein the first image of the first perspective is for a right eye of a user, and the second image of the first perspective is for a left eye of the user.

17. The video processing method according to claim 11, wherein the first image of the first perspective is for a left eye of a user, and the second image of the first perspective is for a right eye of the user.

18. The video processing method according to claim 11, wherein:
each of the first input image, the second input image, and the first disparity map comprises sub-regions, and
a disparity amount of each sub-region of the first disparity map is calculated with a block matching process between the sub-regions of the first input image and the sub-regions of the second input image.

19. The video processing method according to claim 18, wherein each sub-region of the sub-regions of the first input image, the second input image, and the first disparity map comprises 16×16 pixels.

20. The video processing method according to claim 18, wherein the pixels of the second output image is generated by shifting the pixels of the first output image in the longer side direction of the rectangular shape, based on a disparity amount of each sub-region of the second disparity map.

* * * * *